US008818554B2

(12) United States Patent
Lee et al.

(10) Patent No.: US 8,818,554 B2
(45) Date of Patent: Aug. 26, 2014

(54) EVENT EXECUTION METHOD AND SYSTEM FOR ROBOT SYNCHRONIZED WITH MOBILE TERMINAL

(75) Inventors: Seung Jai Lee, Goyang-si (KR); Suk Ryun Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 12/498,086

(22) Filed: Jul. 6, 2009

(65) Prior Publication Data

US 2010/0010669 A1 Jan. 14, 2010

(30) Foreign Application Priority Data

Jul. 14, 2008 (KR) ........................ 10-2008-0067999

(51) Int. Cl.
*G05B 19/04* (2006.01)
*G05B 15/00* (2006.01)
*G05B 19/00* (2006.01)

(52) U.S. Cl.
USPC ............... 700/250; 700/257; 700/264; 901/6; 901/50

(58) Field of Classification Search
CPC .......... H04M 1/7253; H04M 1/72527; H04M 1/72533; H04M 1/72544; H04M 1/72536; H04M 1/72538; H04M 1/26; H04M 1/2755; H04M 1/72; H04M 1/72597; H04M 1/271; A63H 3/28; G10L 15/265; A63F 13/12; A63F 2300/406; A63F 2300/407; A63F 2300/8017; A63F 2300/5526; A63F 2300/65; A63F 2300/5513; A63F 2300/30; A63F 2300/308; A63F 2300/61; A63F 13/10; A63F 2300/8029; A63F 2300/201; A63F 2300/69; A63F 2300/1025
See application file for complete search history.

(56) References Cited

U.S. PATENT DOCUMENTS 6,560,511 B1 5/2003 Yokoo et al.
6,684,127 B2 * 1/2004 Fujita et al. .................. 700/245

(Continued)

FOREIGN PATENT DOCUMENTS

CN 1313781 A 9/2001
CN 1923471 A 3/2007

(Continued)

*Primary Examiner* — Khoi Tran
*Assistant Examiner* — Bao Long T Nguyen
(74) *Attorney, Agent, or Firm* — Jefferson IP Law, LLP

(57) ABSTRACT

An event execution method and system for a robot synchronized with a mobile terminal is provided for enabling a robot synchronized with a mobile terminal or a character displayed in the mobile terminal to execute an event on behalf of the mobile terminal and share experience points of the character displayed in the mobile terminal. The event execution system includes a mobile terminal and a robot synchronized with the mobile terminal. The mobile terminal includes a short range wireless communication unit which establishes a radio link with the robot, a storage unit which stores a character rearing application for bringing up a character and a behavior contents database of behaviors that a character displayed by the character rearing application conducts, and a control unit which performs synchronization with the robot by means of the short range wireless communication unit and sends, when an event occurs, an event execution command indicating the event to the robot through the radio link, and the robot includes a short range wireless communication unit which establishes the radio link with the mobile terminal, a storage unit which stores a robot displaying application for bringing up the robot and a behavior contents data base of behaviors that the robot conducts, and a control unit which performs synchronization with the mobile terminal by means of the short range wireless communication unit and controls the robot to conduct a behavior corresponding to the event indicated by the event execution command.

18 Claims, 11 Drawing Sheets

(56) References Cited

U.S. PATENT DOCUMENTS

| | | | |
|---|---|---|---|
| 6,773,325 B1* | 8/2004 | Mawle et al. | 446/175 |
| 7,299,182 B2* | 11/2007 | Xie | 704/258 |
| 7,373,377 B2* | 5/2008 | Altieri | 709/203 |
| 7,798,885 B2* | 9/2010 | Wong et al. | 446/142 |
| 8,033,901 B2* | 10/2011 | Wood | 463/1 |
| 2001/0021669 A1 | 9/2001 | Gabai et al. | |
| 2002/0059153 A1* | 5/2002 | Dan et al. | 706/25 |
| 2002/0107591 A1* | 8/2002 | Gabai et al. | 700/94 |
| 2002/0116263 A1* | 8/2002 | Gouge | 705/14 |
| 2002/0128746 A1* | 9/2002 | Boies et al. | 700/245 |
| 2003/0073471 A1* | 4/2003 | Varley | 463/1 |
| 2003/0125822 A1* | 7/2003 | LaNeve | 700/91 |
| 2004/0009777 A1 | 1/2004 | Koskimies et al. | |
| 2005/0143174 A1* | 6/2005 | Goldman et al. | 463/42 |
| 2006/0095158 A1 | 5/2006 | Lee et al. | |
| 2006/0178777 A1* | 8/2006 | Park et al. | 700/245 |
| 2006/0293789 A1* | 12/2006 | Frazier | 700/245 |
| 2007/0050084 A1 | 3/2007 | Song et al. | |
| 2007/0191103 A1* | 8/2007 | Van Luchene | 463/42 |
| 2008/0046112 A1* | 2/2008 | Mayers et al. | 700/213 |
| 2008/0139300 A1* | 6/2008 | Ho | 463/23 |
| 2008/0176655 A1* | 7/2008 | James et al. | 463/42 |

FOREIGN PATENT DOCUMENTS

| | | |
|---|---|---|
| EP | 1 761 019 A1 | 3/2007 |
| KR | 10-2000-0072753 A | 12/2000 |
| KR | 10-2001-0081589 A | 8/2001 |
| KR | 10-2001-0106652 A | 12/2001 |
| KR | 10-2003-0028964 A | 4/2003 |
| WO | 2006/104345 A1 | 10/2006 |

* cited by examiner

EVENT EXECUTION METHOD AND SYSTEM FOR ROBOT SYNCHRONIZED WITH MOBILE TERMINAL

PRIORITY

This application claims the benefit under 35 U.S.C. §119(a) of a Korean patent application filed in the Korean Intellectual Property Office on Jul. 14, 2008 and assigned Serial No. 10-2008-0067999, the entire disclosure of which is hereby incorporated by reference.

BACKGROUND OF THE INVENTION

1. Field of the Invention

The present invention relates to an event execution method and system for a robot synchronized with a mobile terminal. More particularly, the present invention relates to an event execution method and system for a robot synchronized with a mobile terminal that enables a robot synchronized with a mobile terminal or a character displayed in the mobile terminal to execute an event on behalf of the mobile terminal and share experience points of the character displayed in the mobile terminal.

2. Description of the Related Art

Conventionally, the word robot refers to an industrial robot which many people have either encountered or quickly recognize. Recently, however, robots have been introduced in various fields and installed even in homes. Particularly, human coexistence style robots that live with and assist humans as well as having intelligent behavior are called personal robots. Personal robots can be classified into two categories: a home service robot for home automation and an entertainment robot for amusement purposes. Several entertainment robots are commercialized already and more new types of robots are being introduced into the market.

Meanwhile, typical mobile terminals now support an application for bringing up a character such that the user can select and display a virtual character within the mobile terminal.

Although the robot and the mobile terminal are separate systems useful enough even when they are used individually, the user is likely to expect practical applications from cooperative use of these two systems. Accordingly, there is a need to develop a method for the robot to conduct a behavior corresponding to an event that has occurred in the mobile terminal and synchronize a virtual character displayed in the mobile terminal with the robot.

SUMMARY OF THE INVENTION

An aspect of the present invention is to address at least the above-mentioned problems and/or disadvantages and to provide at least the advantages described below. Accordingly, an aspect of the present invention is to provide an apparatus and method for synchronizing use information between mobile communication terminals comprising short-range wireless communication units.

An aspect of the present invention is to provide an event execution method and system for a robot synchronized with a mobile terminal that enables the robot synchronized with the mobile terminal to execute an event that has occurred in the mobile terminal.

Another aspect of the present invention is to provide an event execution method and system for a robot synchronized with the mobile terminal that enables a character displayed in a virtual space of the mobile terminal and the robot displayed in the physical space to share their experience points.

In accordance with an aspect of the present invention, an event execution method for a robot synchronized with a mobile terminal is provided. The method includes detecting an event that occurred in a mobile terminal, transmitting an event execution command from the mobile terminal to a robot through a radio link, and executing, at the robot, the event indicated by the event execution command.

In accordance with yet another aspect of the present invention, an event execution system for a robot and a mobile terminal is provided. The mobile terminal includes a short range wireless communication unit for establishing a radio link with the robot, a storage unit for storing a character rearing application for bringing up a character and a behavior contents database of behaviors that a character displayed by the character rearing application conducts, and a control unit for synchronizing with the robot by means of the short range wireless communication unit and for sending, when an event occurs, an event execution command indicating the event to the robot through the radio link, and the robot includes a short range wireless communication unit for establishing the radio link with the mobile terminal, a storage unit for storing a robot displaying application for bringing up the robot and a behavior contents data base of behaviors that the robot conducts, and a control unit for synchronizing with the mobile terminal by means of the short range wireless communication unit and for controlling the robot to conduct a behavior corresponding the event indicated by the event execution command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an exemplary embodiment, the mobile terminal can be a cellular phone, a personal computer, a laptop computer, a Personal Digital Assistant (PDA), a smart phone, an Internal Mobile Telecommunication 2000 (IMT-2000) terminal, and their equivalents. In an exemplary embodiment, the mobile terminal may includes a display implemented with a partial touchscreen or a full touchscreen.

Figure 1:
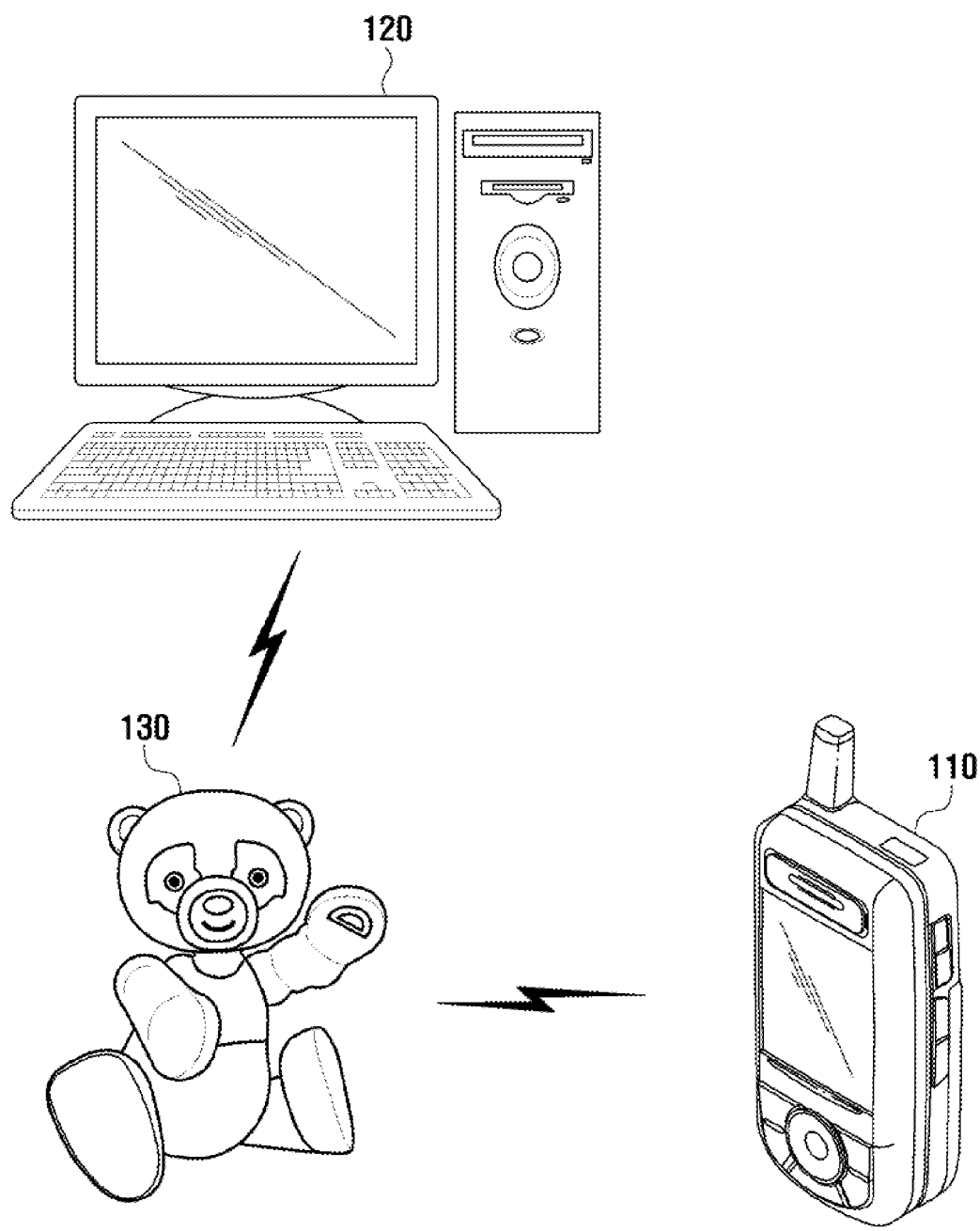
FIG. 1 is a schematic diagram illustrating an event execution system for a robot synchronized with a mobile terminal according to an exemplary embodiment of the present invention.

FIG. 1 is a schematic diagram illustrating an event execution system for a robot synchronized with a mobile terminal according to an exemplary embodiment of the present invention.

Referring to FIG. 1, the system includes a mobile terminal 110 and a robot 130 that can be synchronized with the mobile terminal 110. In another exemplary embodiment, the system can include a Personal Computer (PC) 120 as well as the mobile terminal 110 and the robot 130 that are synchronized with each other.

The mobile terminal 110 can connect to a mobile communication network for supporting basic voice and video communication with another terminal (not shown). The mobile terminal 110 can also support at least one of short messaging and multimedia messaging services.

In an exemplary embodiment, the mobile terminal 110 can be synchronized with the robot 130 via a communication channel established by means of a short range wireless communication technology. When a specific event occurs in the mobile terminal 110 after synchronization between the mobile terminal 110 and the robot 130, the mobile terminal 110 sends an event execution command to the robot 130 through the short range wireless communication link, and the robot 130 receiving the event execution command executes the event indicated by the event execution command.

The mobile terminal 110 activates a character rearing application which displays a character selected by the user. Once the character rearing application is activated, the character can be synchronized with the robot 130 through the short range wireless communication link.

When a character rearing application is activated after the synchronization between the mobile terminal and the robot 130 through the short range wireless communication link, the experience points of the character displayed in the mobile terminal 110 and the robot 130 can be shared in common. When a specific character event (e.g., a behavior event of the character) occurs, an event signal is sent to the robot 130 of the short range wireless communication link, and the robot 130 receiving the event signal executes the event indicated by the event signal.

Although only the synchronization between the mobile terminal 110 and the robot 130 is described, the robot 130 can be synchronized with the PC 120 for the aforementioned operations in another exemplary embodiment. Detailed description on the operations through the synchronization between the robot 130 and the PC 120 are omitted for conciseness.

Figure 2:
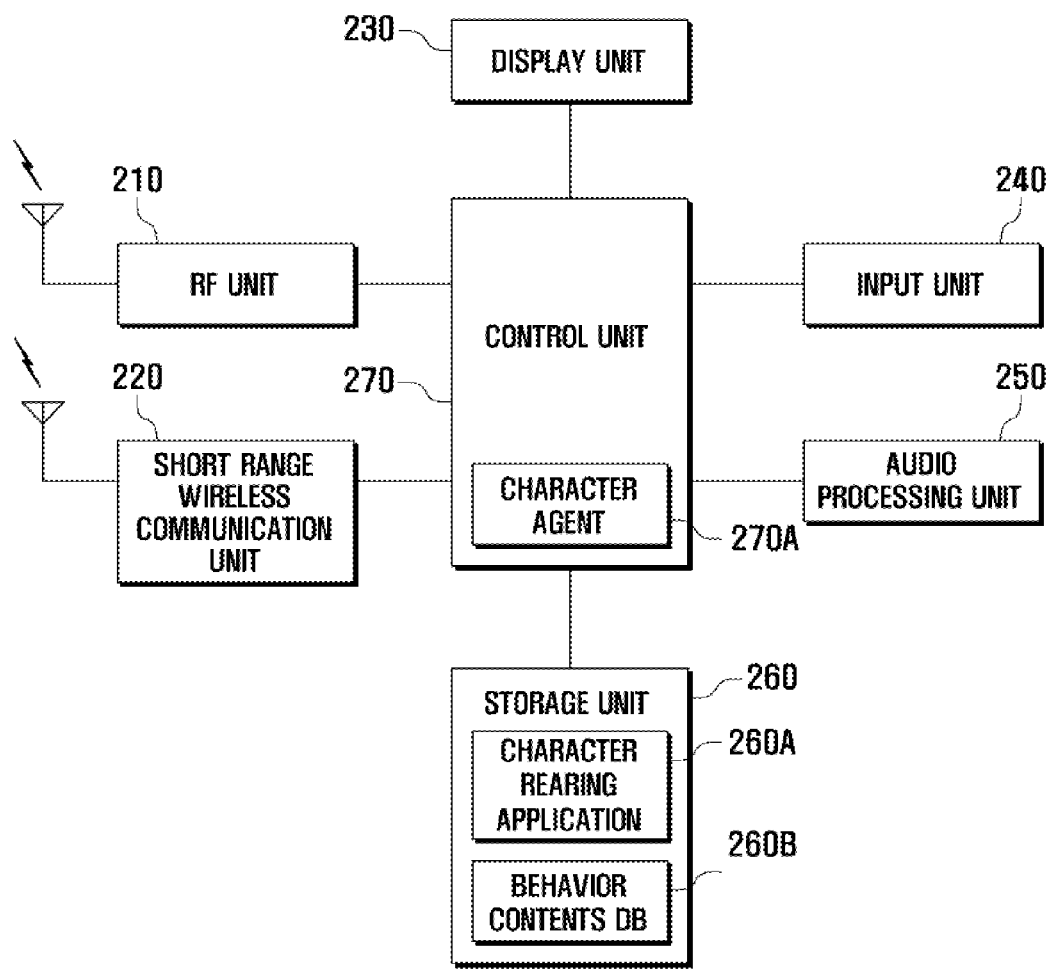
FIG. 2 is a block diagram illustrating an exemplary configuration of the mobile terminal of FIG. 1.

FIG. 2 is a block diagram illustrating an exemplary configuration of the mobile terminal of FIG. 1.

Referring to FIG. 2, the mobile terminal includes a Radio Frequency (RF) unit 210, a short range wireless communication unit 220, a display unit 230, an input unit 240, an audio processing unit 250, a storage unit 260, and a control unit 270. The storage unit 260 includes a character rearing application 260A and a behavior contents database (DB) 260B, and the control unit 270 includes a character agent 270A.

The RF unit 210 is responsible for radio communication of the mobile terminal for supporting the mobile voice communication, short messaging and/or multimedia messaging service, and other types of data communication services. For these purposes, the RF unit 210 includes an RF transmitter which up-converts and amplifies the frequency of the transmission signal and an RF receiver which low noise amplifies and down-converts the received signal.

The short range wireless communication unit 220 establishes a wireless data communication channel with the robot 130 for synchronizing the robot with the mobile terminal 110 or the character displayed in the mobile terminal 110.

In accordance with an exemplary embodiment of the present invention, the short range wireless communication unit 220 can be implemented by means of a Bluetooth module. When the short range wireless communication unit 220 is implemented with the Bluetooth module, the short range wireless communication unit 220 can search for available Bluetooth devices around the mobile terminal and establish a Bluetooth link through a pairing process with at least one of searched Bluetooth devices for data communication.

The display unit 230 is implemented with a display panel such as a Liquid Crystal Display (LCD) for displaying various visual data and operation status of the mobile terminal 110. When the display unit 230 supports a touchscreen function, the display unit 230 can also function as a part of the input unit 240.

The input unit 240 receives data related to the user configuration and control and outputs key input signals. The input unit 240 is provided with a plurality of alphanumeric keys for receiving alphanumeric data and a plurality of function keys for configuring and executing various functions of the mobile terminal 110. In an exemplary embodiment of the present invention, the input unit 240 can be configured to input data and commands for displaying the character.

The audio processing unit 250 is responsible for processing audio signals to be output through a speaker and for processing sound waves input through a microphone to be output to a data processing unit. That is, the audio processing unit 250 processes audio data to be output as an audible sound wave through the speaker and processes audio signals including a voice input through the microphone to be output to the data processing unit in the form of audio data.

The storage unit 260 stores application programs and data related to the operation of the mobile terminal 100. The storage unit 260 may include a program memory region and a data memory region. The program memory region stores an Operating System (OS) for booting up the mobile terminal, application programs for managing an idle mode of the mobile terminal, a camera function, a sound playback function, and still and motion picture playback functions. When a specific function is activated in response to a user command, a corresponding application program is activated for executing the operation indicated by the user command.

In an exemplary embodiment of the present invention, the program memory region of the storage unit 260 includes a character rearing application 260A for bringing up a character and a behavior content database (DB) 260B for managing the information related to the behavior conducted by the character. The behavior contents DB 260B stores the behaviors than can be conducted by the character displayed in the character rearing application 260A by type (e.g. crawling, walking, running, dancing, changing sizes of eyes according to emotion, motions of ears and nose, etc.).

The data memory region stores data generated while the mobile terminal runs the respective application programs, and the data include the contents copied from an external memory or hard disk and downloaded from a web server through wired and wireless Internet. The data memory region also can store the user data related to the supplementary functions of the mobile terminal, e.g. the still and motion pictures taken by using an internal camera function and audio files, as well as the externally collected data.

The control unit 270 controls operations of the mobile terminal and signaling among the internal function blocks of the mobile terminal.

In an exemplary embodiment of the present invention, the control unit 270 controls the short range wireless communication unit 220 to establish a communication channel with the robot 130 for synchronization between the mobile terminal 110 and the robot 130. In an exemplary embodiment, the short range wireless communication unit 220 can be implemented with a Bluetooth module. The control unit 270 also controls displaying the character such that, when a character rearing application is activated after the synchronization between the mobile terminal 110 and the robot through the short range wireless communication, the control unit 270 determines whether the experience points of the character and robot are substantially identical with each other and controls the experience points to be updated and shared by the character and the robot 130 in synchronization.

If an event such as an incoming call, an outgoing call, or a scheduled alarm is detected in the mobile terminal 110, the control unit 270 of the mobile terminal 110 generates an event execution command and sends the event execution command to the robot 130. The event execution command includes an identifier (type) of the event and a command for executing the event.

The control unit 270 also counts the incoming and outgoing messages by caller identifier (ID) during a time period and stores the counts in the form of exemplary Table 1.

TABLE 1

| ID (phone #) | Outgoing Call | Outgoing Message | — | Total |
|---|---|---|---|---|
| 010-XXX-XXXX | 10 | 5 | — | 15 |
| 010-YYY-YYY | 4 | 20 | — | 24 |
| 010-ZZZ-ZZZZ | 1 | 2 | — | 3 |

After the mobile terminal 110 and the robot 130 are synchronized with each other, the control unit 270 of the mobile terminal 110 can send outgoing call information. Upon receipt of the outgoing call, the robot 130 checks the caller ID to which a number of outgoing calls is greater than a threshold value (e.g. 15 times during the recent 30 days) and then, when a robot having an ID substantially identical with the caller ID is detected, recognizes the robot. The counterpart caller ID to which the outgoing call is made frequently often denotes an intimacy with the user associated with the caller ID such that the robots assigned the same caller IDs of the intimate users can be configured to show intimacy with each other.

In an exemplary embodiment of the present invention, the control unit 270 includes a character agent 270A for controlling execution of the character rearing application 260A. Once the character rearing application 260A is activated, the character agent 270A provides a character list listing characters classified by category such that the user can select a character from the list. There can be various categories such as pet, opposite sex friend, son, and daughter. Once a specific character is selected from the list, the character agent 270A provides a menu screen for the user to configure the attributes of the selected character such as characteristic and style. The character agent 270A also provides the experience points such as intelligent point, emotion point, health point, and affection point in quantified form such that the character is shown on the display unit 230 as a still or animated object reflecting the respective experience points. The character agent 270A also can provide a mini game according to the characteristics and improvement level of the character. The mini game can be an English quiz, football, block breaker, etc.

The character agent 270A also can control such that the character conducts the behavior contents stored in the behavior contents DB 260B based on the experience points (i.e. the intelligence points, emotion points, health points, and affection points) in a discrete manner. Table 2 shows exemplary behavior contents associated with the discreet values of the intelligence points.

TABLE 2

| Intelligence Point | Behavior |
|---|---|
| 0 | Crawling |
| 1 | Crawling and walking |
| 2 | Crawling, walking, and running |
| — | — |
| — | — |

In Table 2, the behaviors that the character can express with its intelligence points are listed. That is, the character agent 270A controls such that, when the accumulated intelligence points are low (e.g. intelligence point is zero), the character shows a crawling behavior similar to the actions of a baby. As the intelligence points increase, the character can conduct other behaviors such as walking and running.

Table 3 shows exemplary behavior contents associated with the discrete values of the health points.

TABLE 3

| Health Point | Behavior |
|---|---|
| 0 | Slow walking |
| 1 | Slow walking and fast walking |
| 2 | Slow walking, fast walking, slow running |
| — | — |
| — | — |

In Table 3, the behaviors that the character can express with its health points are listed. The character agent 270A controls such that, when the accumulated health points are low (e.g. health point is zero), the character shows a slow walking behavior. As the health points increase, the character can conduct other improved behaviors such as fast walking and slow running.

Table 4 shows exemplary behavior contents associated with the discrete values of emotion points.

TABLE 4

| Emotion Point | Behavior |
|---|---|
| 0 | Happiness |
| 1 | Happiness and sadness |
| 2 | Happiness, sadness, anger, surprise, scared |
| — | — |
| — | — |

Figure 3:
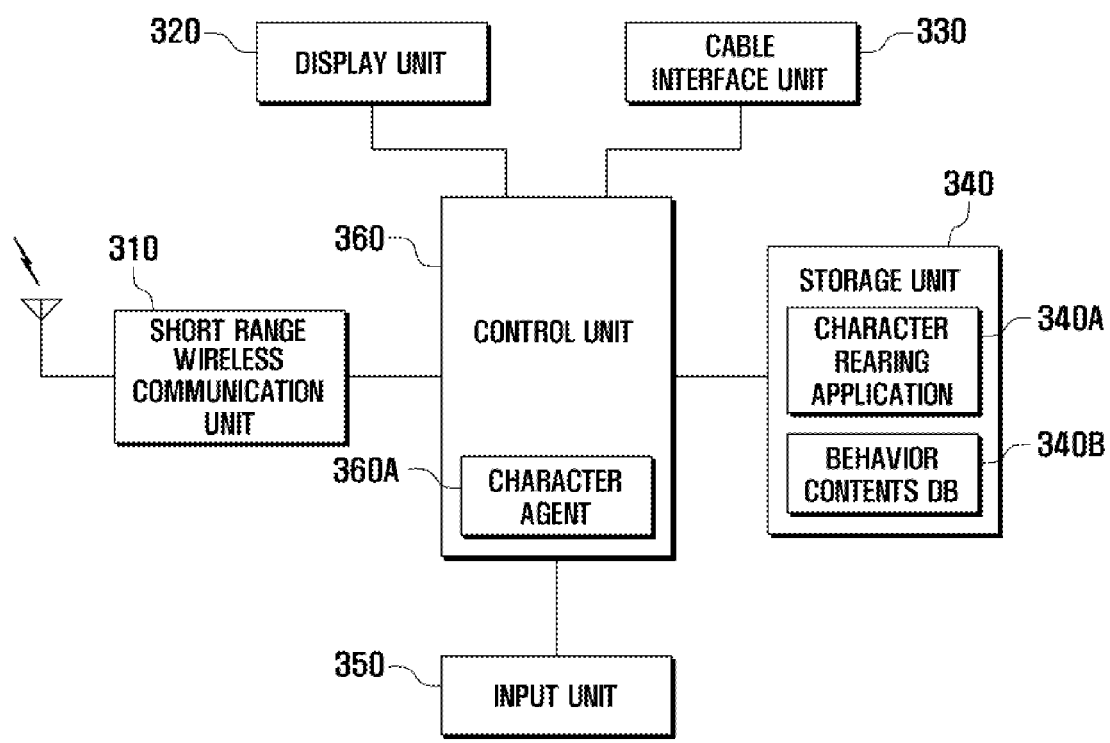
FIG. 3 is a block diagram illustrating an exemplary configuration of the PC of FIG. 1.

FIG. 3 is a block diagram illustrating an exemplary configuration of the PC of FIG. 1.

Referring to FIG. 3, the PC 120 includes a short range wireless communication unit 310, a display unit 320, a cable interface unit 330, a storage unit 340, an input unit 350, and a control unit 360. The storage unit 340 further includes a character rearing application 340A and a behavior contents DB 340B. Also, the control unit 360 includes a character agent 360A.

Since the short range wireless communication unit 310, display unit 320, storage unit 340, and input unit 350 are substantially identical with those of the mobile terminal 110 in operation and function, detailed descriptions thereof are omitted for conciseness.

The cable interface 330 is provided with a connection port for connecting the robot 130 to the PC 120 via a cable. Using the cable interface 330, the PC 120 can communicate with the robot 130 through a cable as well as a wireless channel. That is, the PC 120 can perform synchronization with the robot 130 though the cable interface unit 330 and send an event execution command to the robot 130 such that the robot 130 executes an event instructed by the event execution command. The PC 120 compares the experience points of the character displayed in the PC 120 and the experience points of the robot 130 and updates the experience points of the character displayed in the mobile terminal 110 and the robot 130 to maintain synchronization. In an exemplary embodiment of the present invention, the cable interface 330 may be a Universal Serial Bus (USB) port.

The control unit 360 of the PC 120 controls operations of the PC 120 and signaling among internal function blocks. In an exemplary embodiment of the present invention, the control unit 360 can control the PC 120 such that the mobile terminal 110 and/or the robot 130 can download the character rearing application from the PC 120 to bring up a character on the robot 130.

Figure 4:
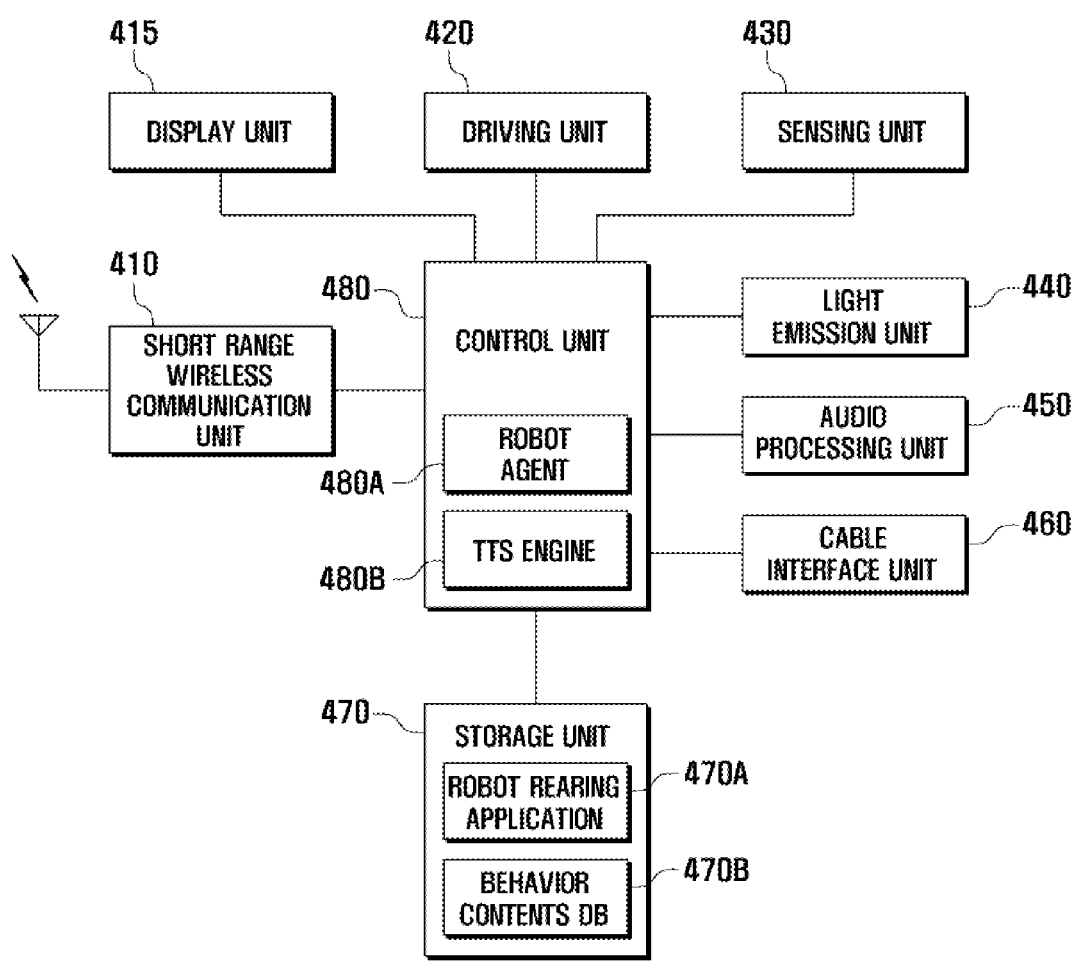
FIG. 4 is a block diagram illustrating an exemplary configuration of the robot 130 of FIG. 1.

FIG. 4 is a block diagram illustrating an exemplary configuration of the robot 130 of FIG. 1.

Referring to FIG. 4, the robot 130 may include a short range wireless communication unit 410, a display unit 415, an driving unit 420, a sensing unit 430, a light emission unit 440, an audio processing unit 450, a cable interface unit 460, a storage unit 470, and a control unit 480. The storage unit 470 stores a robot displaying application 470A and a behavior contents DB 470B, and the control unit 480 includes a robot agent 480A and a Text-To-Speech (TTS) engine 480B.

The short range wireless communication unit 410 establishes a wireless data communication channel with the mobile terminal 110 or the PC 120. The short range wireless communication unit 410 can also establish a data communication channel with another robot. The short range wireless communication unit 410 can be implemented by means of Bluetooth.

The display unit 415 can be implemented with an LCD and display various visual data and an operation status of the robot 130. In case that the display unit 415 supports a touchscreen function, it can work as an input unit. In an exemplary embodiment of the present invention, the display unit 415 can display the text message received by the mobile terminal 110.

The driving unit 420 may include all the parts of the robot 130 that can be controlled according to the control command transmitted by the mobile terminal 110 or the PC 120. That is, the driving unit 420 may include all the parts related to the movement of the robot 130 including wheels for movement, a motor for driving the wheels, arms for performing specific operations, motors for driving the arms and the like.

The sensing unit 430 includes various sensors for sensing exterior environment and movements of objects including a user's gestures. For example, the sensing unit 430 may include a camera for obtaining image data around the robot 130, an infrared sensor or an ultrasonic sensor for supporting recognition of the surrounding environment, a tactile sensor for sensing and comparing contact strengths or applying powers to an object, a temperature sensor for sensing temperature of the surrounding environment and robot, an acceleration sensor for sensing the tilt and movement acceleration of the robot, a vibration sensor for sensing vibration of the robot, etc. Using the sensing unit 430, the robot 130 can communicate with the user interactively.

The light emission unit 440 includes a plurality of white, red, and blue Light Emission Diodes (LEDs) and is used for indicating detection on a specific event execution command and event execution status. The light emission unit 440 can also express emotions such as happiness, sadness, anger, affection, etc. by blinking various colored lights in various patterns. For instance, the robot 130 can express the emotion of anger by blinking the LEDs of the light emotion unit 440 frequently.

In another exemplary embodiment of the present invention, when an alarm command is received from the mobile terminal 110, the robot 130 can execute the alarm command by blinking a plurality of LEDs periodically.

The audio processing unit 450 includes a speaker for outputting the audio signal processed in the robot 130 and a microphone for receiving the audio signal including voice from outside and delivering the audio signal to a data processing unit. In an exemplary embodiment of the present invention, the robot 130 is configured to distinguish different voices and sounds and recognize the user's voice and commands by means of the audio processing unit 450.

The cable interface unit 460 is provided with a connection for connecting the robot 130 to the PC 120 via a cable. Using the cable interface 460, the robot 130 can communicate with the PC 120 through a cable as well as a wireless channel. Since the cable connection has been described with reference to FIG. 3, detailed description thereon is omitted for conciseness.

The storage unit 470 stores application programs and data required for the operations of the robot 130.

In an exemplary embodiment of the present invention, the storage unit 470 includes a robot displaying application 470A for bringing up the robot 130 and a behavior contents DB 470B for storing behavior contents which the robot 130 expresses. In order to bring up the character of the mobile terminal 110 and the robot 130 in synchronization by sharing their experience points, the character rearing application 260A stored in the storage unit of the mobile terminal 110 can be substantially identical with the robot displaying application 470A stored in the storage unit of the robot 130. In this case, the character rearing application controls such that the behavior of the character is displayed on the display unit 230 of the mobile terminal 110, while the robot displaying application controls the robot 130 to express the expected behavior by itself.

The behavior contents DB 470B stores the behavior contents to be expressed by the robot 139. In an exemplary implementation, the behavior contents are stored by type. Since the management of the behavior contents has been described with reference to FIG. 2, detailed description thereof is omitted.

The control unit 480 controls operations of the robot 130 and signaling among the internal function blocks of the robot 130.

In an exemplary embodiment of the present invention, the control unit 480 of the robot 130 controls the short range wireless communication unit 410 to establish a communication channel with either the mobile terminal 110 or the PC 120 such that the robot can be synchronized with the mobile terminal or the PC 120.

The control unit 480 also receives the experience points request message transmitted by the mobile terminal 110 or the PC 120 and transmits the experience points to the mobile terminal 110 or the PC 120 in response to the experience points request message. In case of receiving an experience update request message from the mobile terminal 110 or the PC 120, the control unit 480 updates the experience points of the robot 130 with the experience points received from the mobile terminal 110 or the PC 120.

When an event execution command is received from the mobile terminal 110 or the PC 120, the control unit 480 of the robot 130 analyzes the received event execution command and determines a behavior of the robot 130 based on the type of the event that occurred in the mobile terminal 110 or the PC 120 and the command included in the event execution command. Once the behavior of the robot 130 is determined, the control unit 480 controls the function blocks of the robot 130 such that the robot 130 conducts the behavior.

The control unit 480 controls the short range wireless communication unit 410 to receive the information on the outgoing call transmitted by the mobile terminal 110. When the outgoing call information is received, the control unit 480 analyzes the outgoing call information and checks the caller IDs (e.g. counterpart phone numbers) to which the number of outgoing calls is greater than a threshold value. The control unit 480 can search for the robots recognized with the caller IDs of which the number of outgoing calls are greater than a threshold value and control such that the intimacy to the robot increases.

The control unit 480 is provided with a robot agent 480A which controls the execution of the robot displaying application stored in the storage unit 470. The robot agent 480A learns from the experiences with the data accumulated by means of the sensing unit 430 and controls the robot 130 to grow. The robot agent 480A controls such that the robot 130 perceives the surrounding environment and learns the situations such as user's praise and punishment. For instance, when the user gives the robot 130 a punishment for seeing a ball, the robot 130 expresses a dislike for the ball thereafter. In contrast, when the user gives the robot 130 praise for seeing the ball, the robot 130 expresses a like for the ball thereafter. The robot agent 480A controls such that the robot 130 gains experience points such as intelligence points, emotion points, health points, and affection points from the learning process.

The functions of the robot agent 480A and the character agent 270A of the mobile terminal 110 are substantially identical with each other in that the agent configures the attributes such as characteristics and style of either the character or the robot 130 and drives either the character or the robot 130 based on the quantified experience points including the intelligence points, emotion points, health points, and affection points. Like the character agent 270A, the robot agent 480A can control such that the robot 130 conducts the behavior contents stored in the behavior contents database 470A based on the experience points (i.e. the intelligence points, emotion points, health points, and affection points) in a discrete manner.

The TTS engine 480B converts language text into audio wave data. The audio wave data synthesized by the TTS engine 480B is converted into an analog audio signal so as to be output in the form of voice speech through a speaker. In an exemplary embodiment of the present invention, the TTS engine 480B can process the texts included in the message transmitted by the mobile terminal 110 to be output in the form of voice speech.

Figure 5:
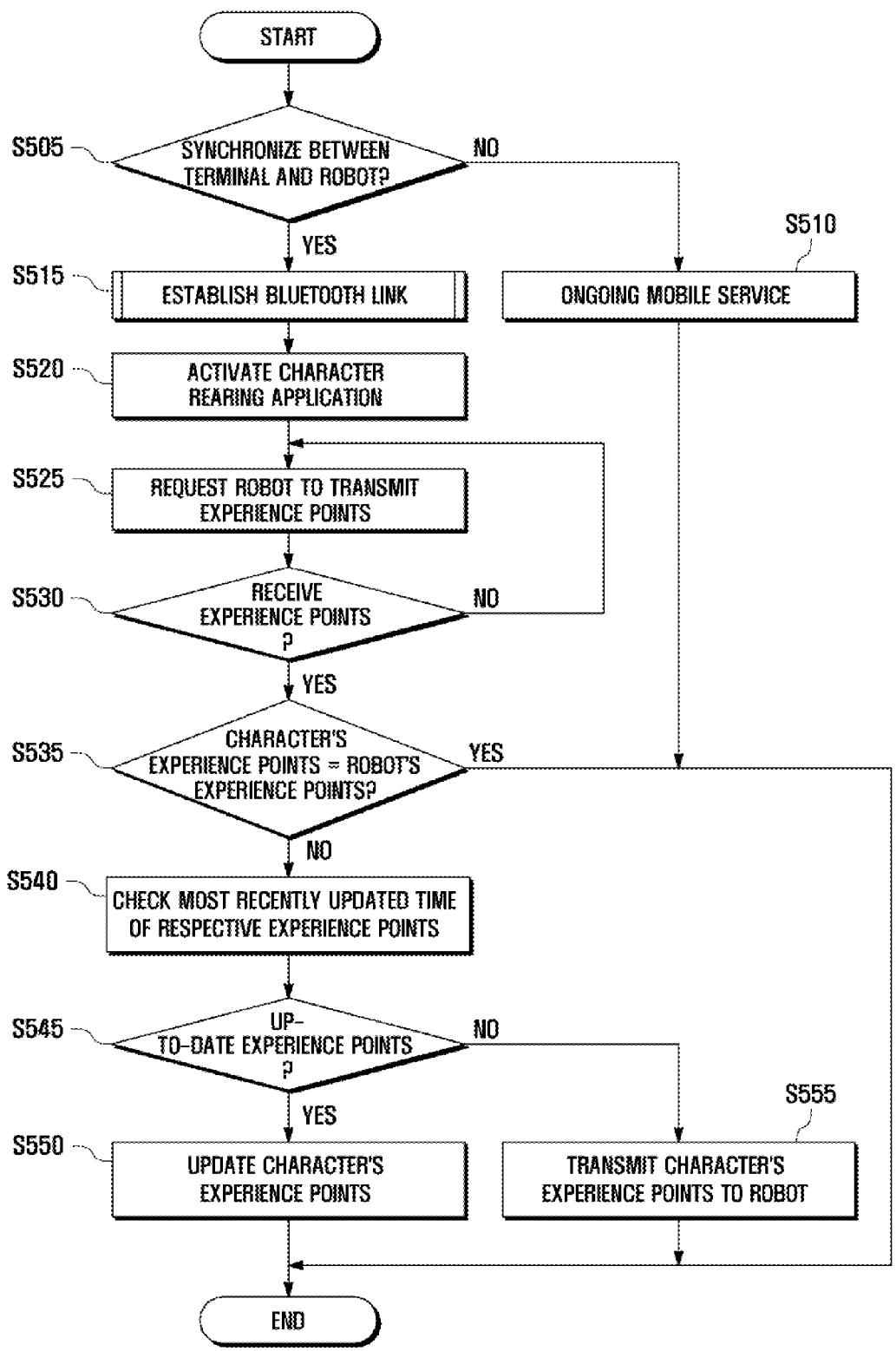
FIG. 5 is a flowchart illustrating an experience points synchronization procedure between a character displayed by a character rearing application of a mobile terminal and a robot displayed by a robot displaying application in an event execution method according to an exemplary embodiment of the present invention.

FIG. 5 is a flowchart illustrating an experience points synchronization procedure between a character displayed by a character rearing application of a mobile terminal and a robot displayed by a robot displaying application in an event execution method according to an exemplary embodiment of the present invention. In this example, the mobile terminal 110 and the robot 130 communicate with each other through a Bluetooth link for synchronizing the experience points.

Although FIG. 5 is depicted as an experience points synchronization between a mobile terminal and a robot, it is obvious to those skilled in the art that the procedure can be applied between a PC and a Robot.

Referring to FIG. 5, the control unit 270 of the mobile terminal 110 first determines whether the mobile terminal 110 is attempting synchronization with the robot 130 in step S505. If the mobile terminal 110 is attempting synchronization with the robot 130, the control unit 270 controls such that the mobile terminal 110 establishes a communication link with the robot 130 by means of Bluetooth technology in step S515. The Bluetooth link establishment process is described below with reference to FIG. 6.

Figure 6:
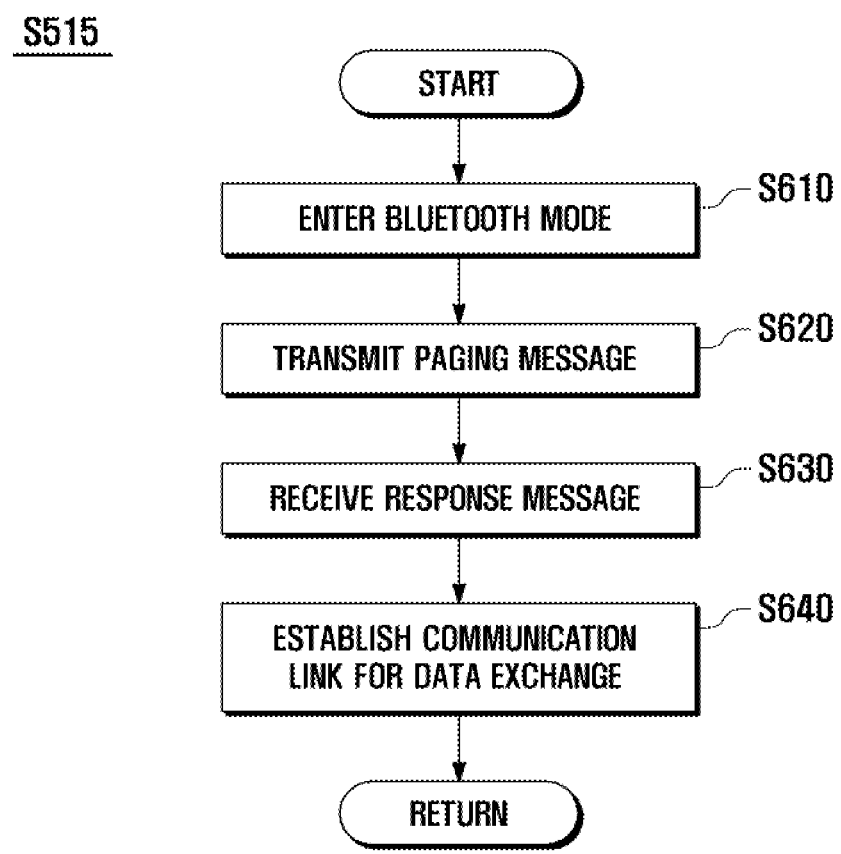
FIG. 6 is a flowchart illustrating an exemplary Bluetooth link establishment process of FIG. 5.

FIG. 6 is a flowchart illustrating an exemplary Bluetooth link establishment process of FIG. 5. Referring to FIG. 6, the control unit 270 controls such that the mobile terminal 110 enters a Bluetooth communication mode in step S610 and transmits a paging message to the robot 130 in step S620. Once a response message is received from the robot 130 in step S630, the control unit 270 establishes a Bluetooth link with the robot 130 for synchronization of the experience points between the mobile terminal 110 and the robot 130 in step S640.

After the Bluetooth link is established between the mobile terminal 110 and the robot 130, the control unit 270 activates the character rearing application in step S520. The control unit 270 sends an experience points request message to the robot 130 for comparing the experience points of the character displayed in the mobile terminal and the robot 130 in step S525. The robot 130 sends the mobile terminal 110 an experience points response message containing distinct intelligence points, emotion points, health points, and affection points as shown in Table 5.

TABLE 5

| Intelligence points | Emotion points | Health points | Affection points | Recent update |
|---|---|---|---|---|
| 3 | 5 | 2 | 1 | — 20:38, July 3, 2008 |

After sending the experience points request message, the control unit 270 determines whether an experience points response message is received from the robot 130 in step S530. If an experience points response message is received from the robot 130, the control unit 270 determines whether the experience points of the robot 130 that are extracted from the experience points response message are substantially identical with the experience points of the character displayed in the mobile terminal 110 in step S535. If the experience points of the robot 130 are not substantially identical with the experience points of the character, the control unit 270 determines the most recent update times of the respective experience points in step S540 and determines whether the experience points of the robot 130 are the most recent ones in step S545. If the experience points of the robot 130 are the most recent, the control unit 270 updates the experience points of the character with those of the robot 130 in step S550. Otherwise, if it is determined that the experience points of the robot 130 are not the most recent ones at step S545, the control unit 270 controls the mobile terminal 110 to send the experience points of the character to the robot 130 through the Bluetooth link in step S555.

In this manner, the mobile terminal 110 establishes a Bluetooth link with the robot 130, activates the character rearing application, and performs synchronization of the experience points of the character displayed in the mobile terminal 110 and the robot 130.

Figure 7:
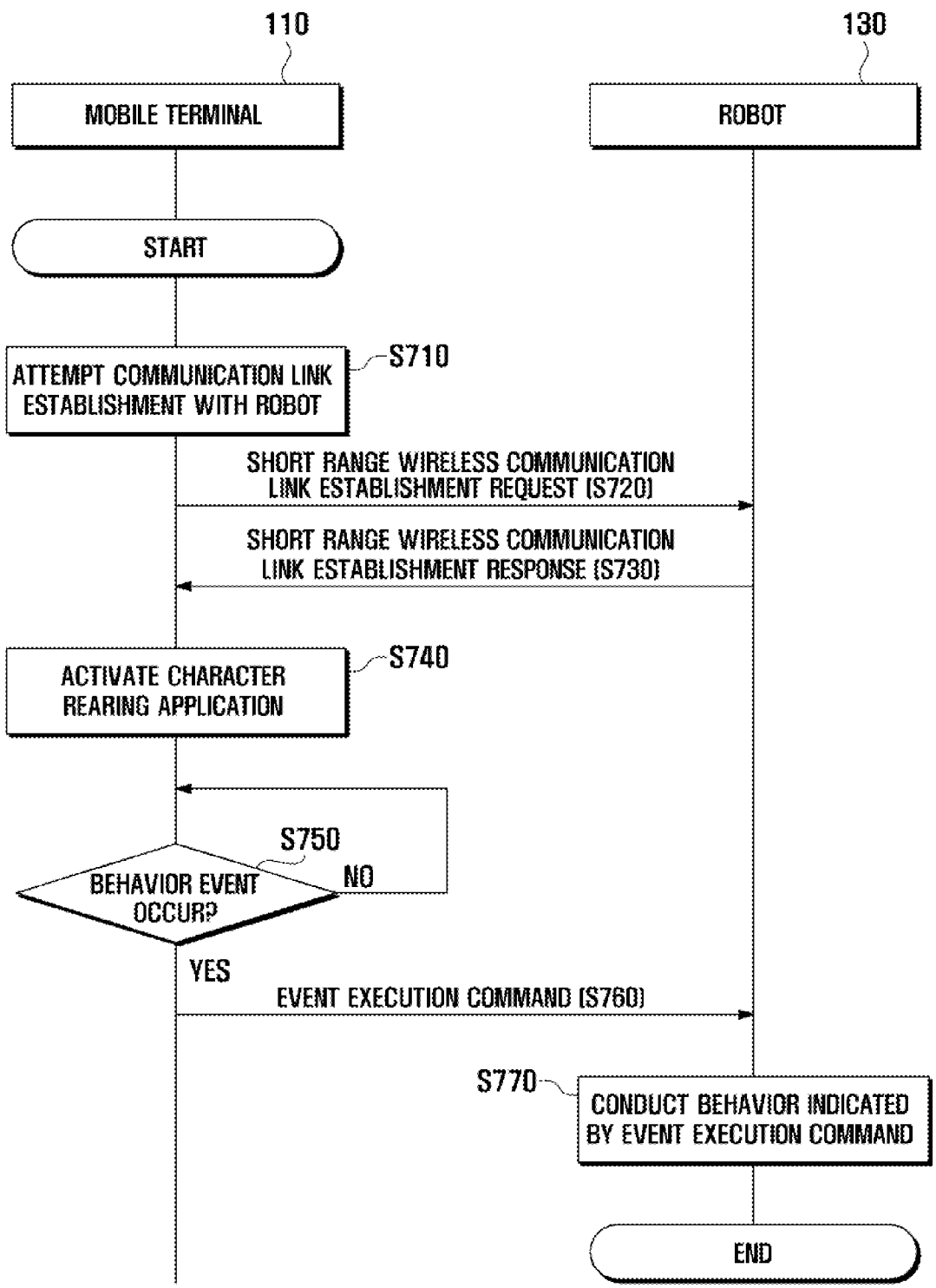
FIG. 7 is a signaling diagram illustrating an event execution method for a robot synchronized with a mobile terminal according to an exemplary embodiment of the present invention.

FIG. 7 is a signaling diagram illustrating an event execution method for a robot synchronized with a mobile terminal according to an exemplary embodiment of the present invention.

Referring to FIG. 7, the mobile terminal 110 first detects an event for establishing a communication link with the robot 130 in step S710. Once an event for a communication link establishment is detected, the mobile terminal 110 sends a short range wireless communication link establishment request message to the robot 130 in step S720. The short range wireless communication link can be established by means of Bluetooth technology. Upon receipt of the short range wireless communication link establishment request message, the robot 130 sends the mobile terminal 110 a short range wireless communication link establishment response message in step S730. By exchanging the communication link establishment message, a wireless communication link is established between the mobile terminal 110 and the robot 130.

After the wireless communication link establishment, the mobile terminal 110 activates the character rearing application in step S740 and monitors to detect a behavior event related to the character displayed in the mobile terminal 110 in step S750. If a behavior event is detected, the mobile terminal 110 sends the robot 130 an event execution command in step S760. Upon receipt of the event execution command, the robot 130 analyzes the event execution command and controls the driving unit 420 to conduct a behavior indicated by the event execution command in step S770.

For instance, when a walking event of the character is detected, the mobile terminal 110 sends the robot 130 an event execution command instructing the walking behavior through the short range wireless communication link. Upon receipt of the event execution command, the control unit 480 of the robot 130 analyses the event execution command to determine the walking event and controls the driving unit 420 to drive the robot 130 to conduct the walking behavior.

Although the event execution of the robot 130 driven by the behavior event of the character displayed in the mobile terminal 110 is depicted in FIG. 7, it is obvious to those skilled in the art that the event execution of the character displayed in the mobile terminal 110 can be driven by the behavior event occurred in the robot 130.

Figure 8:
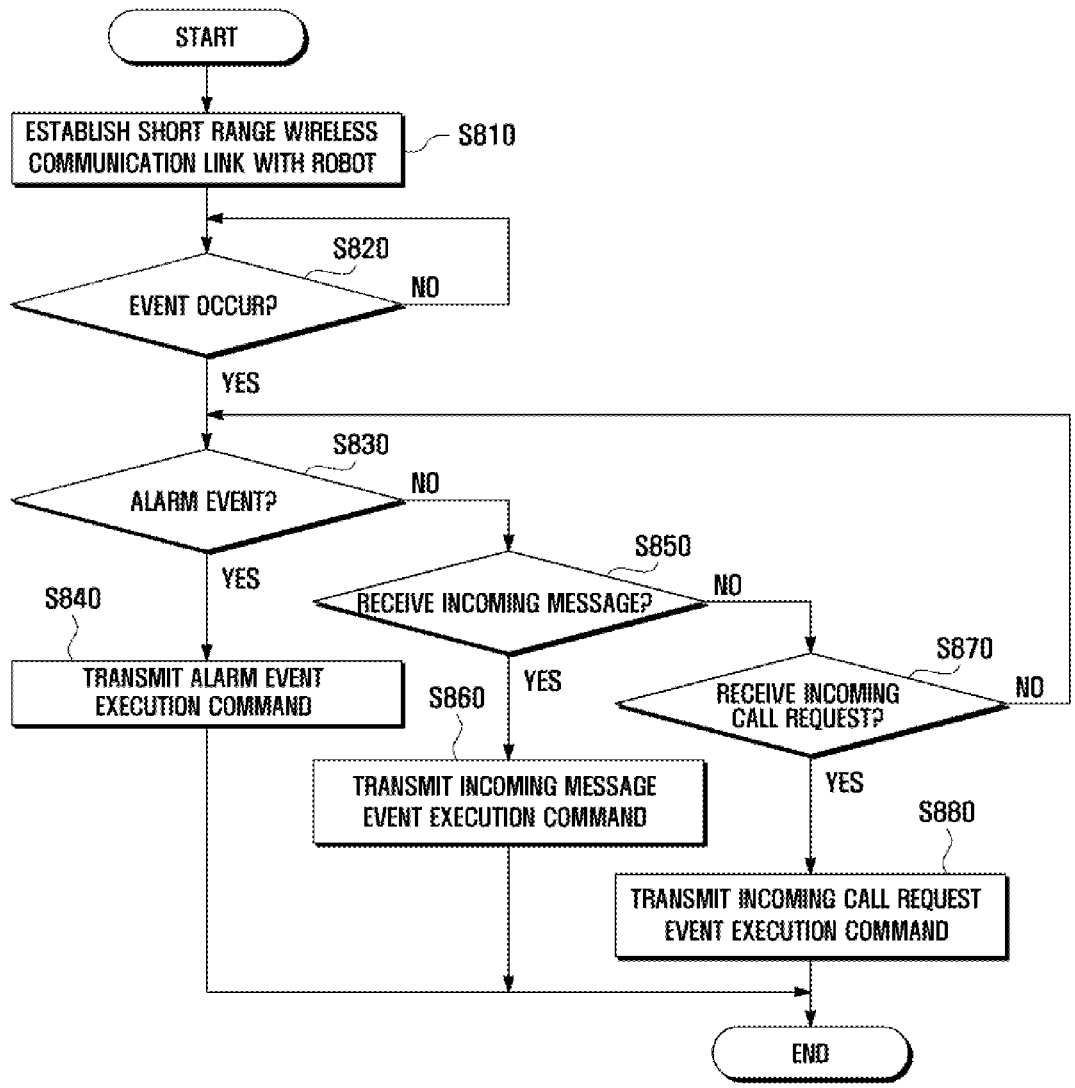
FIG. 8 is a flowchart illustrating an event execution method for a robot synchronized with a mobile terminal in view of the mobile terminal according to an exemplary embodiment of the present invention.

FIG. 8 is a flowchart illustrating an event execution method for a robot synchronized with a mobile terminal in view of the mobile terminal according to an exemplary embodiment of the present invention.

Referring to FIG. 8, the mobile terminal 110 and the robot 130 first perform synchronization via a short range wireless link in step S810. Next, the mobile terminal 110 monitors to detect an event in step S820. If an event is detected, the mobile terminal 110 determines whether the event is an alarm event in step S830. If the detected event is an alarm event, the mobile terminal 110 sends the robot 130 an alarm event execution command to the mobile terminal 110 in step S840 such that the robot 130 executes an alarm indicated by the alarm event execution message.

Otherwise, if the detected event is not an alarm event, the mobile terminal determines whether the event is an incoming message event in step S850. If the detected event is an incoming message event, the mobile terminal 110 sends the robot 130 an incoming message event execution command through the wireless communication link in step S860 such that the robot 130 executes the incoming message in a preset form.

Otherwise, if the detected event is not an incoming message event, the mobile terminal 110 determines whether the detected event is an incoming call request event in step S870. If the detected event is an incoming call request event, the mobile terminal 110 controls the short range wireless communication unit to send the robot 130 an incoming call request event execution command in step S880 such that the robot 130 executes the incoming call establishment command to put the user through the line.

Although the event execution procedure is described with reference to an exemplary alarm event, incoming message event, and incoming call event, the present invention is not limited thereon. For instance, when one of a game execution event, a schedule check event, a DMB playback event, an MP3 playback event, a fairy tale narration event, a video file playback event, the mobile terminal 110 can sends the robot 130 an event execution command indicating one of the event to be executed such that the robot 130 executes the event indicated by the event execution command.

Figure 9:
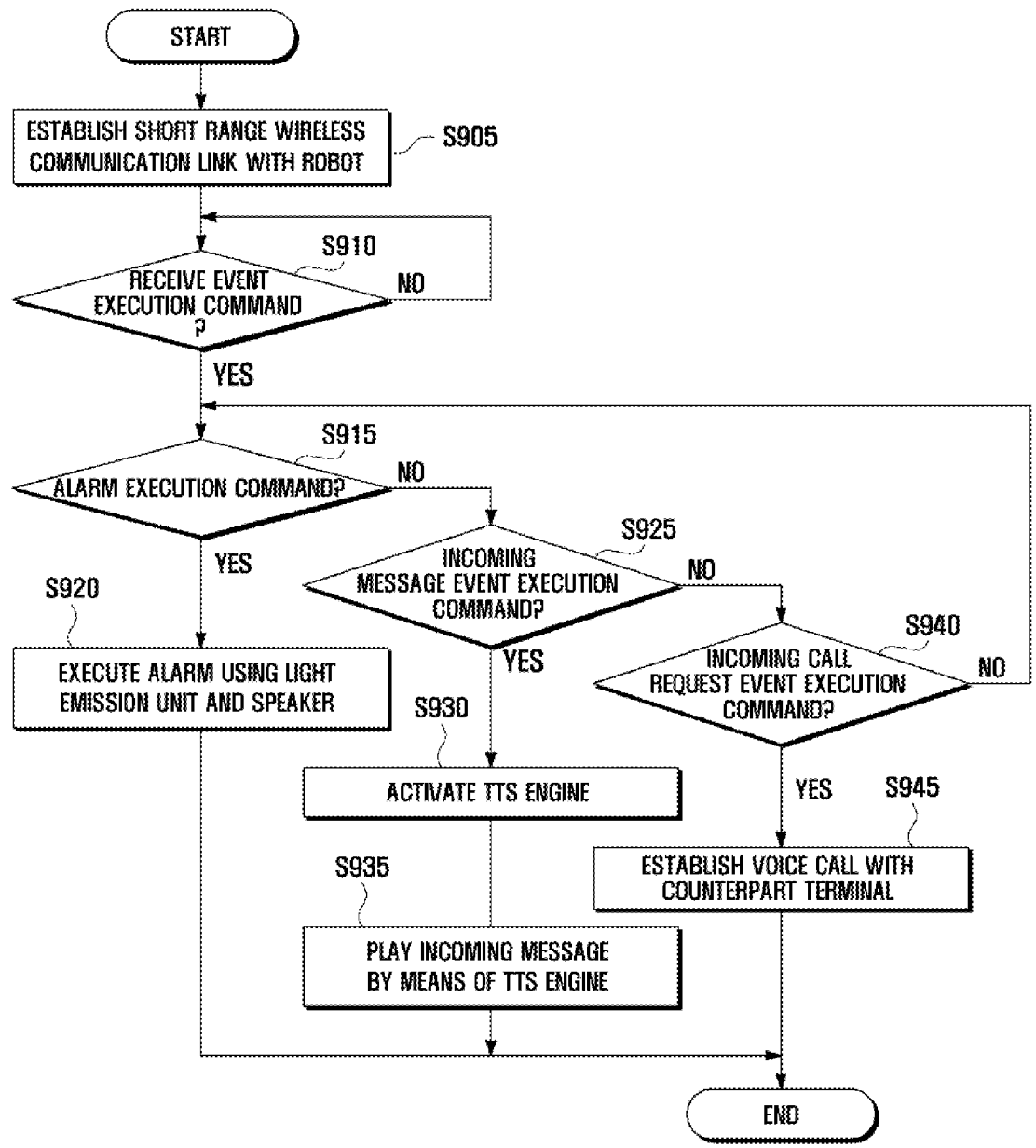
FIG. 9 is a flowchart illustrating an event execution method for a robot synchronized with a mobile terminal in view of the robot according to an exemplary embodiment of the present invention.

FIG. 9 is a flowchart illustrating an event execution method for a robot synchronized with a mobile terminal in view of the robot according to an exemplary embodiment of the present invention.

Referring to FIG. 9, the robot 130 is synchronized with the mobile terminal 110 through a short range wireless communication link in step S905. Next, the robot 130 monitors to receive an event execution command in step S910. If an event execution command is received, the robot 130 extracts the type of event and determines whether the event execution command is an alarm execution command in step S915. If the event execution command is an alarm execution command, the robot 130 controls the driving unit 420, light emission unit 440, and audio processing unit 450 to execute the alarm event indicated by the alarm execution command in step S920.

At this time, the robot 130 moves near the user for alarming the user effectively. The robot 130 can measure the distance to the user by means of the signal strength of the short range wireless link. Since the signal strength received from the mobile terminal carried by the user becomes stronger as the robot 130 moves closer to the mobile terminal 110, the robot 130 can detect the location of the user (i.e. the mobile terminal). Also, the robot 130 can recognize a human face using a camera in cooperation with the sensing unit 430 and identify a registered user by comparing a face captured by the camera with previously stored left, right, and front profiles of the registered user. Accordingly, the robot 130 locates the user and moves to near the user, blinking the LEDs of the light emission unit 440 and outputting an alarm sound by means of the audio processing unit 450.

Figure 10A:
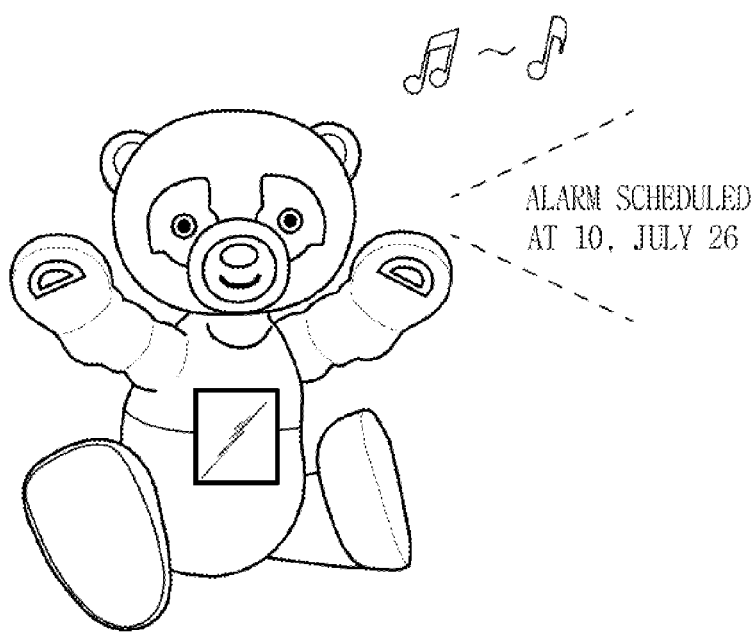
FIG. 10A is a drawing illustrating a robot executing an alarm event indicated by the event execution command received from a mobile terminal according to an exemplary embodiment of the present invention.

FIG. 10A is a drawing illustrating a robot executing an alarm event indicated by the event execution command received from a mobile terminal according to an exemplary embodiment of the present invention.

In case that the mobile terminal 110 is placed at a remote location, the user is not likely to perceive the alarm event occurred in the mobile terminal 110. In an exemplary embodiment of the present invention, the robot 130 synchronized with the mobile terminal 110 can locate the user such that, when an alarm event is informed by the mobile terminal 110, the robot 130 moves closer to the user and executes the alarm event on behalf of the mobile terminal 110, whereby the user has no chance to miss the alarm event.

Referring again to FIG. 9, if the event execution command is not an alarm execution command, the robot 130 determines whether the event execution command is an incoming message execution command in step S925. If the event execution command is an incoming message execution command, the robot 130 activates the TTS engine 480B in step S930, and the TTS engine 480B outputs the incoming message received by the mobile terminal 110 in the form of a synthesized voice speech in step S935. In another exemplary embodiment of the present invention, the incoming message can be displayed on the display unit 415 of the robot 130 in the form of a text message.

Figure 10B:
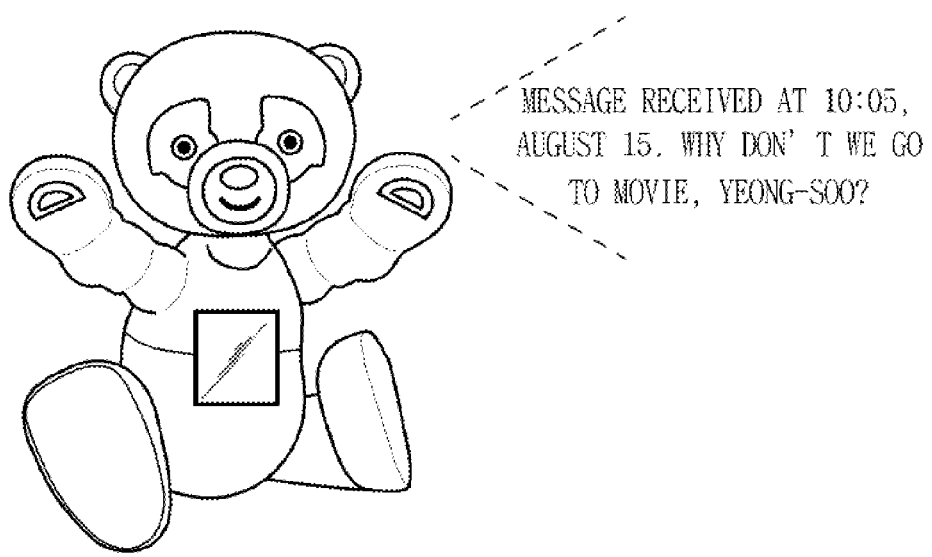
FIG. 10B is a drawing illustrating a robot executing an incoming message execution event indicated by the event execution command received from a mobile terminal according to an exemplary embodiment of the present invention.

FIG. 10B is a drawing illustrating a robot executing an incoming message execution event indicated by the event execution command received from a mobile terminal according to an exemplary embodiment of the present invention.

When an incoming text or voice message is received by the mobile terminal 110, the robot 130 synchronized with the mobile terminal 110 can output the incoming text or voice message in the form of a text or voice speech without user manipulation, thereby improving user convenience.

If it is determined that the event execution command is not an incoming message execution command at step S925, the robot 130 determines whether the event execution command is a voice call execution command in step S940. If the event execution command is a voice call execution command, the robot 130 establishes a voice call with a counterpart terminal in response to the user's intention in step S945. In this case, the voice data received from the counterpart terminal is relayed to the robot 130 via the mobile terminal 110 such that the audio processing unit 450 of the robot 130 outputs the voice data through the speaker in the form of an audible sound wave. Also, the voice signal input through the microphone is processed by the audio processing unit 450 and then transmitted to the counterpart terminal via the mobile terminal 110.

Figure 10C:
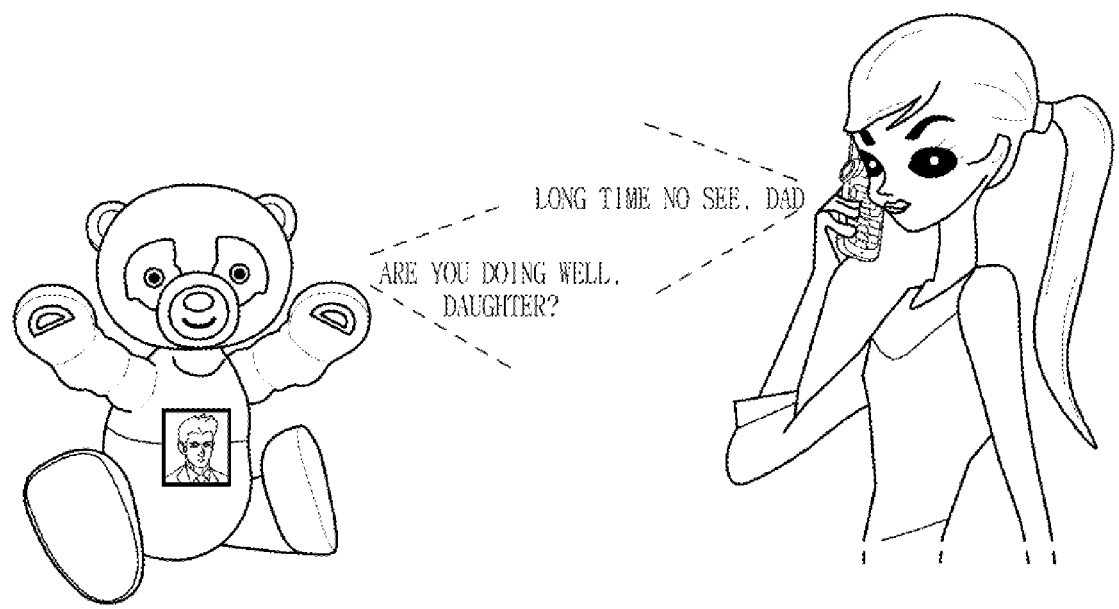
FIG. 10C is a drawing illustrating a robot executing a voice call execution event indicated by the event execution command received from a mobile terminal according to an exemplary embodiment of the present invention.

FIG. 10C is a drawing illustrating a robot executing a voice call execution event indicated by the event execution command received from a mobile terminal according to an exemplary embodiment of the present invention.

When an incoming call is requested, the user can reply to the incoming call received by the mobile terminal 110 with the assistance of the robot 130.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the event execution method and system for a robot in synchronization with a mobile terminal is advantageous since the robot can execute an event such as a voice call alert, an incoming message alert, and a scheduled alarm on behalf of the mobile terminal.

Also, the event execution method and system for a robot synchronized with a mobile terminal enables a character displayed in the mobile terminal to share it experience points with a robot, whereby the character displayed in a virtual space and the robot displayed in a physical space behave in synchronization.

What is claimed is:

1. An event execution method for synchronizing with a robot of a mobile terminal, the method comprising:
   synchronizing experience information of a character of the mobile terminal and experience information of the robot to update a behavior contents database, wherein the behavior contents database defines at least one available behavior being conducted at the robot;
   detecting an event that occurred in a mobile terminal;
   transmitting an event execution command corresponding to the detected event to the robot, and
   wherein the experience information comprises intelligence information, emotion information, health information, and affection information, and
   wherein the behavior of the robot is affected by the experience information.

2. The method of claim 1, wherein the event comprises an alarm event, and
   wherein the robot locates and moves to a user and
   outputs an alarm indicated by the alarm event.

3. The method of claim 1, wherein the event comprises an incoming message event, and wherein the robot outputs an incoming message in the form of a voice.

4. The method of claim 1, wherein the event comprises a call establishment event.

5. The method of claim 1, wherein the synchronizing of the experience information comprises:
   requesting the robot to transmit the experience information;
   receiving the experience information from the robot; and comparing the experience information of the mobile terminal with the experience information of the robot.

6. The method of claim 5, wherein the comparing of the experience information comprises:
checking update times of a character displayed in the mobile terminal and the robot; and
updating the experience information of the character and the robot with a most recently updated value at the update times.

7. The method of claim 6, wherein the event comprises a behavior event of the character, and the executing of the event comprises conducting, at the robot, a behavior corresponding to the behavior event.

8. The method of claim 7, wherein the behavior event comprises at least one of crawling, walking, running, dancing, pupil-dilating, ear-pricking, and lip-pursing events.

9. The method of claim 7, wherein the behavior event is determined based on a value of the experience information of the character or the robot.

10. A mobile terminal comprising:
a wireless communication unit for establishing a radio link with a robot;
a storage unit for storing a behavior contents database of behaviors that a character of the mobile terminal or the robot conducts; and
a control unit for synchronizing experience information of a character of the mobile terminal and experience information of the robot to update the behavior contents database, wherein the behavior contents database defines at least one available behavior being conducted at the robot, detects an event of the mobile terminal, transmits an event execution command corresponding to the detected event to the robot, and controlling the robot to execute the event execution command for executing a behavior corresponding to the event of the mobile terminal,
wherein the experience information comprises intelligence information, emotion information, health information, and affection information, and
wherein an execution of the robot is affected by the experience information.

11. The mobile terminal of claim 10, wherein the event comprises an alarm event, and the control unit of the robot controls the robot to locate and move to a user and output an alarm indicated by the alarm event.

12. The mobile terminal of claim 10, wherein the event comprises an incoming message event, and the control unit of the robot controls the robot to output an incoming message in the form of a voice speech.

13. The mobile terminal of claim 10, wherein the event comprises a call establishment event.

14. The mobile terminal of claim 10, wherein the experience information comprises at least one of intelligence information, emotion information, health information, and affection information.

15. The mobile terminal of claim 10, wherein the available behavior is determined based on a value of the experience information of the character or the robot.

16. The mobile terminal of claim 14, wherein the control unit of the mobile terminal requests the robot to transmit the experience information, receives the experience information from the robot, and compares the experience information of the mobile terminal with the experience information of the robot.

17. The mobile terminal of claim 16, wherein the control unit of the mobile terminal determines update times of the character and the robot and updates the experience information of the character and the robot with a most recently updated value at the update times.

18. The mobile terminal of claim 17, wherein the control unit checks update times of a character of the mobile terminal and the robot, and updates the experience information of the character and the robot with a most recently updated value at the update times.

* * * * *